March 30, 1948. F. E. WALTERS 2,438,525
SOLDERING IRON
Filed Aug. 17, 1944 2 Sheets-Sheet 1

Inventor
Frederick Edward Walters
By Clarence A. O'Brien
and Harvey B. Jacobson
Attorneys

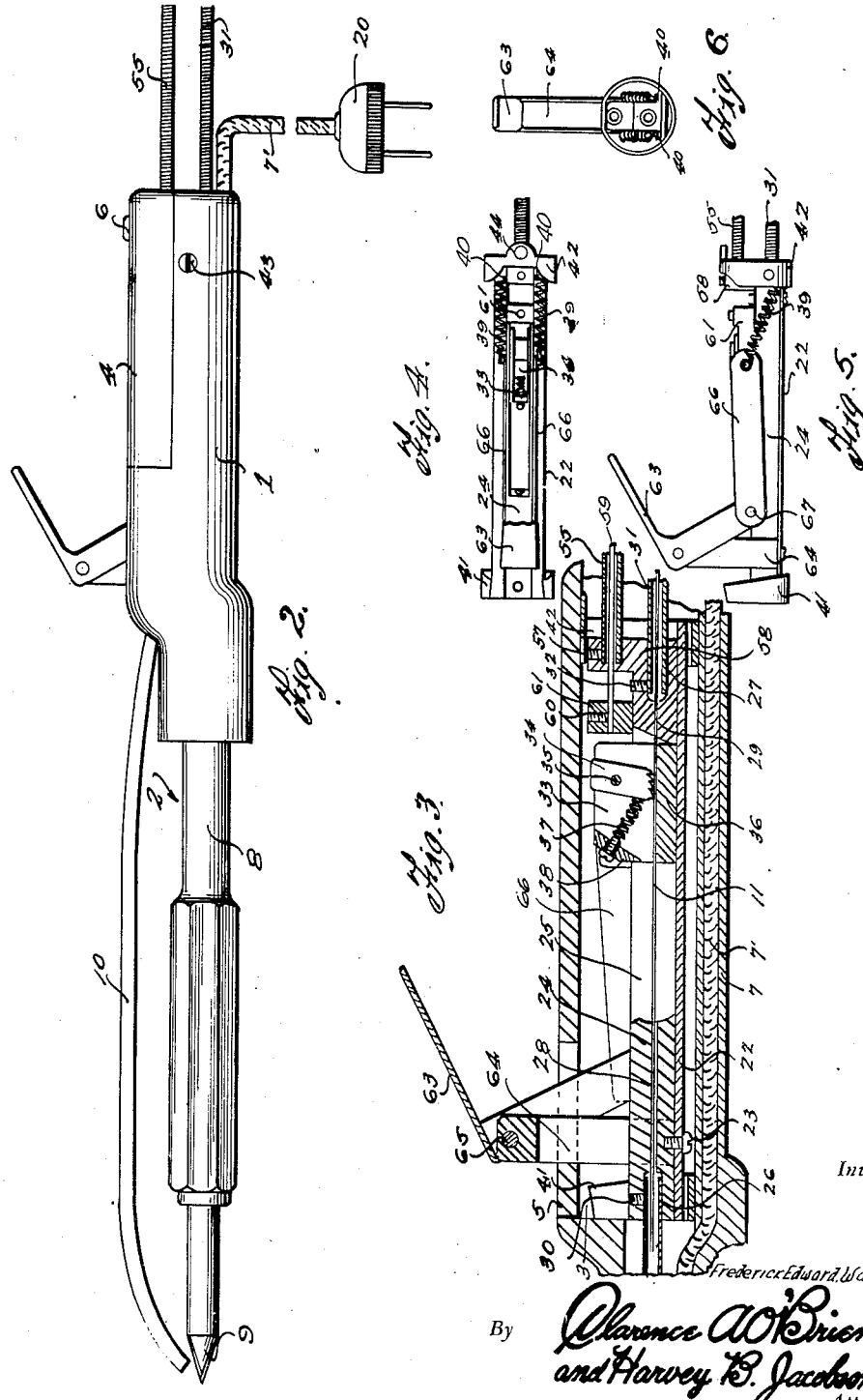

Patented Mar. 30, 1948

2,438,525

UNITED STATES PATENT OFFICE 2,438,525

SOLDERING IRON

Frederick Edward Walters, Chicago, Ill.

Application August 17, 1944, Serial No. 549,931

1 Claim. (Cl. 113—109)

My invention relates to improvements in soldering irons, and more particularly to means for feeding solder thereto in wire or strip form.

The primary object of my invention is to provide means for feeding such solder through an electrically heated soldering iron in a manner such that both hands, or at least one hand, may be left free for holding work, or other purposes, and which is of simple form, inexpensive construction, substantially fool-proof, and constitutes a labor and time saving device whereby soldering is materially expedited and simplified.

Other and subordinate objects are also comprehended by my invention, all of which, together with the precise nature of my improvements, will be readily understood when the succeeding description and claim are read with reference to the drawings accompanying and forming part of this specification.

Figure 1:
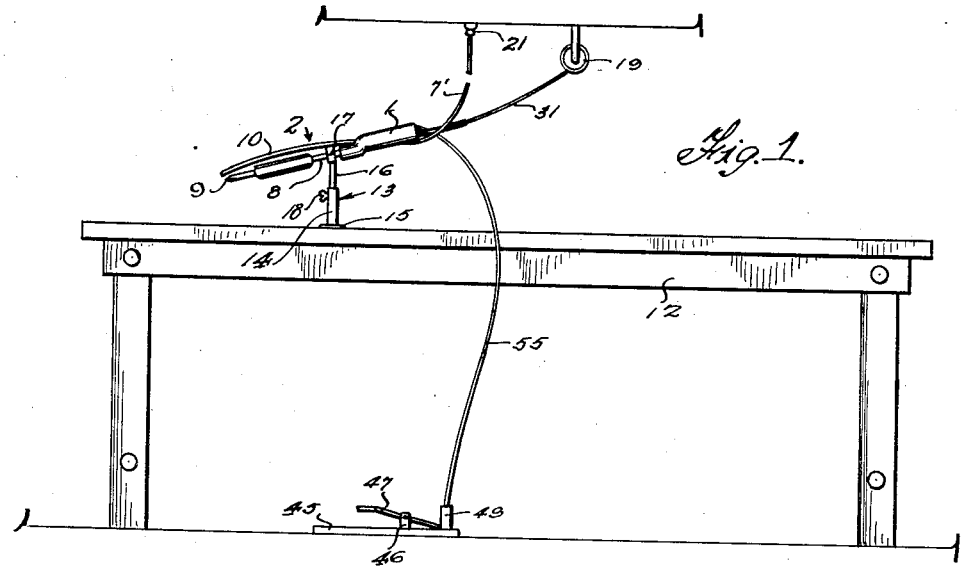
Figure 7:
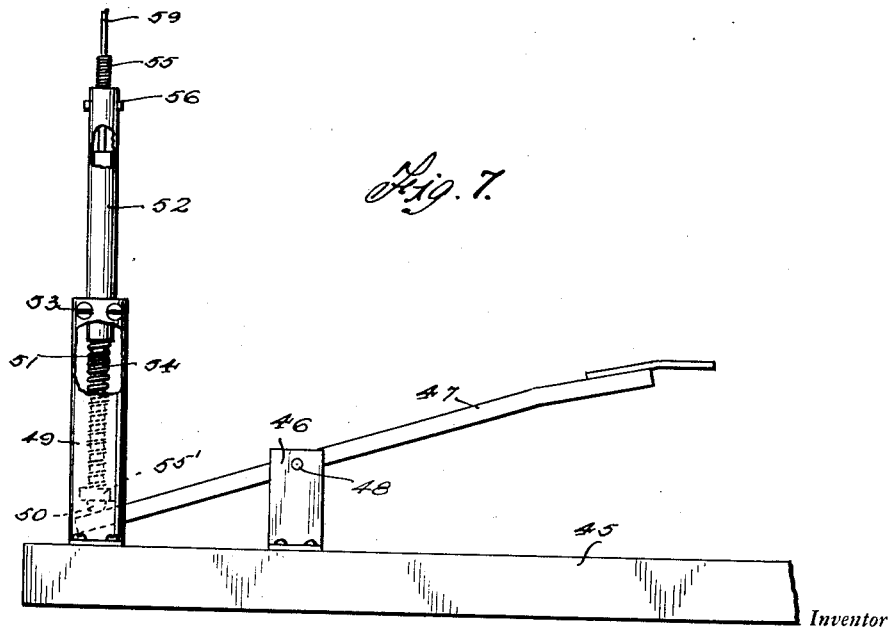

In said drawings:

Figure 1 is a view in side elevation of my invention, in a preferred embodiment thereof, Figure 2 is a view in side elevation of the soldering iron and appurtenant parts, drawn to an enlarged scale, Figure 3 is a view in longitudinal section taken through the handle of the soldering iron and the solder feeding unit, drawn to a further enlarged scale, Figure 4 is a view in plan of the solder feeding unit detached, Figure 5 is a view of the same in side elevation, Figure 6 is a view of the same in rear end elevation, Figure 7 is a view in side elevation of the treadle means for operating the carriage.

Referring to the drawings by numerals, according to my invention, as illustrated, the generally cylindrical handle 1 of an electric soldering iron, designated 2 as a unit, is provided with a top chamber 3 therein of elongated form and open at the rear end of the handle 1. The chamber 3 is adapted to be closed by a relatively shorter cap plate 4 forming part of the handle 1, and which, together with said chamber 3, provides a longitudinal top slot 5 in said handle 1 adjacent the front end thereof, and for a purpose presently seen. A screw 6 holds the cap plate 4 in place in a manner presently made clear. Below the chamber 3, a longitudinal bore 7 is provided in the handle 1 for the extension of the usual electric cord 7' therethrough. The cord 7' is connected to the usual electrical heating medium in the shank 8 of the soldering iron 1 for heating the tip 9 of said shank. The electric heating medium and connection of the cord 7' thereto form no part, per se, of my invention, and, therefore, it has not been deemed essential to a clear understanding of the invention to illustrate said medium and connection.

A tubular nozzle 10 adapted for feeding wire solder 11 therethrough extends out of the front end of the chamber 3 and alongside the shank 8. The nozzle 10 is suitably curved to direct solder fed therethrough from its front end across the tip 9.

Preferably, in the practice of my invention, the soldering iron 2 is mounted on a work table 12 in forwardly and downwardly inclining position, and by means of a standard 13 comprising a tubular column 14 having a base flange 15 to be suitably secured to said table, and a rod section 16 slidably and rotatably adjustable in the column 14 to vary the height of the standard and adjust the soldering iron 1 into different angular positions. The rod section 16 is equipped with a suitable yoke 17 for clamping around the shank 8 to hold the soldering iron in the described inclined position. A setscrew 18 in the column 14 provides for holding the rod section 16 stationary. The solder 11 is preferably taken from a reel 19, in wire form, which is suitably fixed to a wall or ceiling, and the electric cord 7' is designed to be plugged in, as indicated at 20, to an electrical outlet, as at 21.

A solder feeding unit is provided in the chamber 3 comprising a base bar 22 extending along the bottom of said chamber and upon which is secured by screws, as at 23, a relatively narrower, longitudinally extending guide bar 24 of rectangular cross section. The guide bar 24 embodies a longitudinal guide slot 25 intermediate the front and rear ends thereof, a pair of front and rear end, axial, socket-forming bores 26, 27, and a pair of front and rear, axial counter bores 28, 29. The front bore 26 forms a socket for the rear end of the tubular nozzle 10 which is fixed therein as by a set screw 30. The rear bore 27 forms a socket for a solder guide tube 31 of flexible form and which is fixed in said socket by a set screw 32. The guide tube 31 and the counter bores 28, 29 form guides through which the solder 11 is extended through the guide bar 24 and the slot 25, to the nozzle 10 to be fed forwardly through the nozzle in a manner presently apparent.

A solder feeding carriage 33 of U shape in cross section is slidably fitted in the slot 25 for advance and retraction in said slot and on the bar 22. A solder feeding dog 34 is pivoted in said carriage 33 for swinging movement, in one direction, about a transverse pivot pin 35 to engage ratchet teeth 36 on one end thereof with the solder 11 when the carriage 33 is advanced, and clamp said solder to the bottom of said carriage so that the solder will be advanced with the carriage and thereby fed through the nozzle 19. A coil spring 37 interposed between said dog 34 and a transverse bridge member 38 in the carriage 33 urges said dog in the direction to effect clamping of the solder 11, and permits said dog 34 to drag loosely over the solder 11 when the carriage 33 is retracted. A pair of coil springs 39, upon opposite sides of the guide bar 24, anchored at one end to transverse pins 40 in said bar, and at the other ends thereof to the beforementioned pin 35, yieldingly restrains the carriage 33 against the rear end of the slot 25 and against advance movement.

A resilient clip 41 of the split ring type, suitably affixed to the front end of the base bar 22 and frictionally engaging the sides and bottom of the chamber 3 centers the described solder feeding unit, at its front end, in said chamber. A similar, but annular, member 42 suitably secured to the rear end of said bar 22 centers said solder feeting unit, at its rear end, in the chamber 3. Screws, as at 43, extended through the sides of the handle 1 into said member 42 secure said unit in place. The member 42 is provided with an edge lug 44 through which the previously described screw 6 extends to anchor the cap plate 4 in place.

Treadle means is provided for advancing the carriage 33 by foot pressure. As best shown in Figure 7, the treadle means comprises a block 45 adapted to be disposed on the floor and having rising therefrom intermediate the ends thereof a suitable support 46 for a foot treadle 47 pivoted intermediate its ends, as at 48, to the support 46. The working end of the treadle 47 is suitably extended into an upstanding bracket 49 on one end of the block 45 for lifting action against a ball bearing 50 mounted on a push rod 51 slidable in a tubular guide 52 rising from said bracket 49 with its lower end clamped in said bracket by screws 53. A coil spring 54 circumposed on the rod 51 between the tubular guide 52 and a nut 55 on the lower end of said rod opposes operation of said rod by said treadle 47. A flexible wire tube 55 is secured at one end, by set screws 56, in the upper end of the tubular guide 52 and has its other end extended through the open rear end of the handle 1 and fixed by a set screw 57 in an apertured boss 58 upstanding from the rear end of the guide bar 24. A flexible wire 59 is suitably connected to the upper end of the push rod 51, extended through said flexible tube 55 and the apertured ear 58 and has its opposite end fixed by a set screw 60 in the rear end 61 of a yoke-like slide straddling the carriage 33 and riding on the upper face of the guide bar 24. The beforementioned pin 35 extends through the described slide to establish an operating connection between the slide and said carriage.

As will be seen, when the treadle 47 is depressed, the push rod 51 is elevated to thrust the flexible wire 59 in the proper direction to push the guide 61 forwardly and thereby advance the carriage 33 to feed the solder 11 in the manner already described. Upon release of the foot treadle 47, the springs 39 retract the carriage 33 idly with respect to the solder 11, and the spring 54 retracts the push rod 51 which returns the treadle 47 to normal position.

In addition to the foregoing, my invention comprehends means for advancing the carriage 33 by thumb pressure comprising a bifurcated thumb lever 63 straddling the outer end of a bifurcated post 64 rising from the base bar 22 out of the slot 5 and straddling the guide bar 24, said lever being pivoted, as at 65, to said post for rocking movement under thumb pressure and in opposite directions, respectively. A pair of links 66 operatively connect the thumb lever 63 to the beforementioned carriage 33, said links being disposed upon opposite sides of the guide bar 24 and having front ends pivoted to said lever 63, as at 67, and the rear ends pivotally mounted on the beforementioned pin 35 at opposite sides of the slide 61.

To advance the carriage 33 by thumb pressure, it is merely necessary to exert such pressure against the lever 63 to swing the same clockwise, as viewed in Figure 3, said lever when swung in said direction exerting pull upon the links 66 to advance the carriage 33 in opposition to the springs 39, primarily, and thereby feed the solder 11 in a manner already described. When the thumb lever 63 is used, the described treadle means is disconnected by removing the set screws 57, 60 and detaching the flexible tube 55 from the ear 58 and the flexible wire 59 from the rear end 61 of the described yoke-like slide. Obviously, the soldering iron 2 may be detached from the standard 13 for use in the usual manner when manipulating the same.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

In a soldering iron, a hollow elongated handle adapted for the passage of wire solder therethrough and forming a chamber extending longitudinally in the same, a longitudinally extending guide bar in said chamber having a longitudinal slot therein intermediate the ends thereof and an axial bore through which the wire solder is adapted to be fed and passed through said slot, a U-shaped solder feeding carriage slidably fitted in the slot of said guide bar for advance and retraction therein along said guide bar, and through which said wire solder is adapted to slidably extend, coacting devices in said carriage for yieldingly clamping the wire solder to the carriage during advance of said carriage, and manipulative means for advancing the carriage comprising a yoke straddling the same and slidable on said guide bar.

FREDERICK EDWARD WALTERS.

REFERENCES CITED

The following references are of record in the file of this patent:

UNITED STATES PATENTS

| Number | Name | Date |
| --- | --- | --- |
| 2,119,462 | Kull et al. | May 31, 1938 |
| 1,540,859 | Plicque | June 9, 1925 |
| 2,280,879 | Anderson | Apr. 28, 1942 |
| 1,268,877 | Orme | June 11, 1918 |
| 1,951,545 | Carson, Jr. | Mar. 20, 1934 |
| 2,125,781 | Harris | Aug. 2, 1938 |